United States Patent [19]
Huang

[11] Patent Number: 5,865,460
[45] Date of Patent: *Feb. 2, 1999

[54] FOLDABLE MECHANISM FOR USE IN A STROLLER

[76] Inventor: Li-chu Chen Huang, No.99, Fuchou 7th St., Chiayi City, Taiwan

[ * ] Notice: The term of this patent shall not extend beyond the expiration date of Pat. No. 5,460,398.

[21] Appl. No.: 721,725

[22] Filed: Sep. 27, 1996

[51] Int. Cl.$^6$ ..................................................... B62B 7/06
[52] U.S. Cl. ........................................... 280/642; 280/650
[58] Field of Search ..................................... 280/642, 643, 280/644, 650, 641, 647; 297/16.1, 24; 403/92, 93

[56] References Cited

U.S. PATENT DOCUMENTS

| | | | |
|---|---|---|---|
| 4,415,180 | 11/1983 | Payne, Jr. | 280/650 |
| 5,056,805 | 10/1991 | Wang | 280/47.36 |
| 5,244,228 | 9/1993 | Chiu | 280/642 |
| 5,257,799 | 11/1993 | Cone et al. | 280/642 |
| 5,447,323 | 9/1995 | Huang | 280/642 |
| 5,454,584 | 10/1995 | Haut et al. | 280/642 |
| 5,460,398 | 10/1995 | Huang | 280/642 |
| 5,482,311 | 1/1996 | Huang | 280/642 |
| 5,645,293 | 7/1997 | Cheng | 280/642 |

FOREIGN PATENT DOCUMENTS

| | | |
|---|---|---|
| 2 106 048 | 4/1983 | United Kingdom . |
| 2 248 269 | 4/1992 | United Kingdom . |

*Primary Examiner*—Brian L. Johnson
*Assistant Examiner*—Avraham H. Lerner
*Attorney, Agent, or Firm*—Merchant, Gould, Smith, Edell, Welter & Schmidt, P.A.

[57] ABSTRACT

A stroller includes a handle, a foldable mechanism securely connected with the handle, a pair of rear supports pivotally connected with the foldable mechanism and a pair of front supports pivotally connected with said foldable mechanism. The foldable mechanism has an upper controlling member having a pivotal switch received therein and a channel for receiving a coil spring therein and a lower controlling member having a stepped engagement surface provided thereon. A stepped engagement surface is formed on the switch such that the stepped engagement of the switch will match with the stepped engagement surface of the lower controlling member and provide a strong construction configuration when the stroller of the invention is in use and therefore is able to prevent accidental collapse when the stroller is receives a great impact.

4 Claims, 6 Drawing Sheets

FOLDABLE MECHANISM FOR USE IN A STROLLER

FIELD OF THE INVENTION

The present invention generally relates to a foldable mechanism for use in a stroller, and more particularly to a foldable mechanism which has an upper controlling member having a switch pivotally received therein and a lower controlling member which is detachably connected with the upper controlling member. A first stepped engagement surface is provided on the switch such that the stepped engagement surface of the switch is able to securely connect with a second stepped surface provided on the lower controlling member to strengthen the connected relationship between the upper controlling member and the lower controlling member.

BACKGROUND OF THE INVENTION

Strollers having a braking system for parking safely, wheels for steering, and foldable means for storage have been widely used all over the world. By means of the above mentioned improved devices, a user can provide a comfortable environment to a baby and convenience for herself/himself while walking outdoors.

Most of the devices are designed to provide a better environment for babies while walking outdoors, especially on paved roads. Yet, for the reason of convenience of storage, most strollers have foldable mechanisms provided therein, therefore, a user will have no trouble to store the stroller in the trunk of a car while the stroller is no longer in use.

Most foldable mechanisms designed in strollers are provided to have a switch actuating the folding and unfolding process of the stroller. The switch controls two engagement members each respectively configured as an "L" and detachably connected with each other, with one of the two members being in an inverted position. It is to be noted that this kind of connection is not safe for babies especially when the stroller is accidentally in a collision of a great impact. When the stroller receives great impact, the two engagement members of the foldable mechanism of the stroller may thus be accidentally separated from each other and cause a crisis.

From the previous description, it is noted that unless the foldable mechanism is redesigned to have a better connection between the two engagement members, accidents will be inevitable when the stroller receives great impact.

Thus, a stroller constructed in accordance with the present invention tends to mitigate and/or obviate the aforementioned problems.

SUMMARY OF THE INVENTION

The main objective of the invention is to provide a foldable mechanism for use in a stroller. The foldable mechanism comprises a locking means which has two stepped surfaces mutually and securely connected with each other when the stroller is in use, such that the stroller has strong construction configuration to prevent accidental separation from happening.

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein.

DETAILED DESCRIPTION OF THE PREFERRED EMBODIMENT

Figure 1:
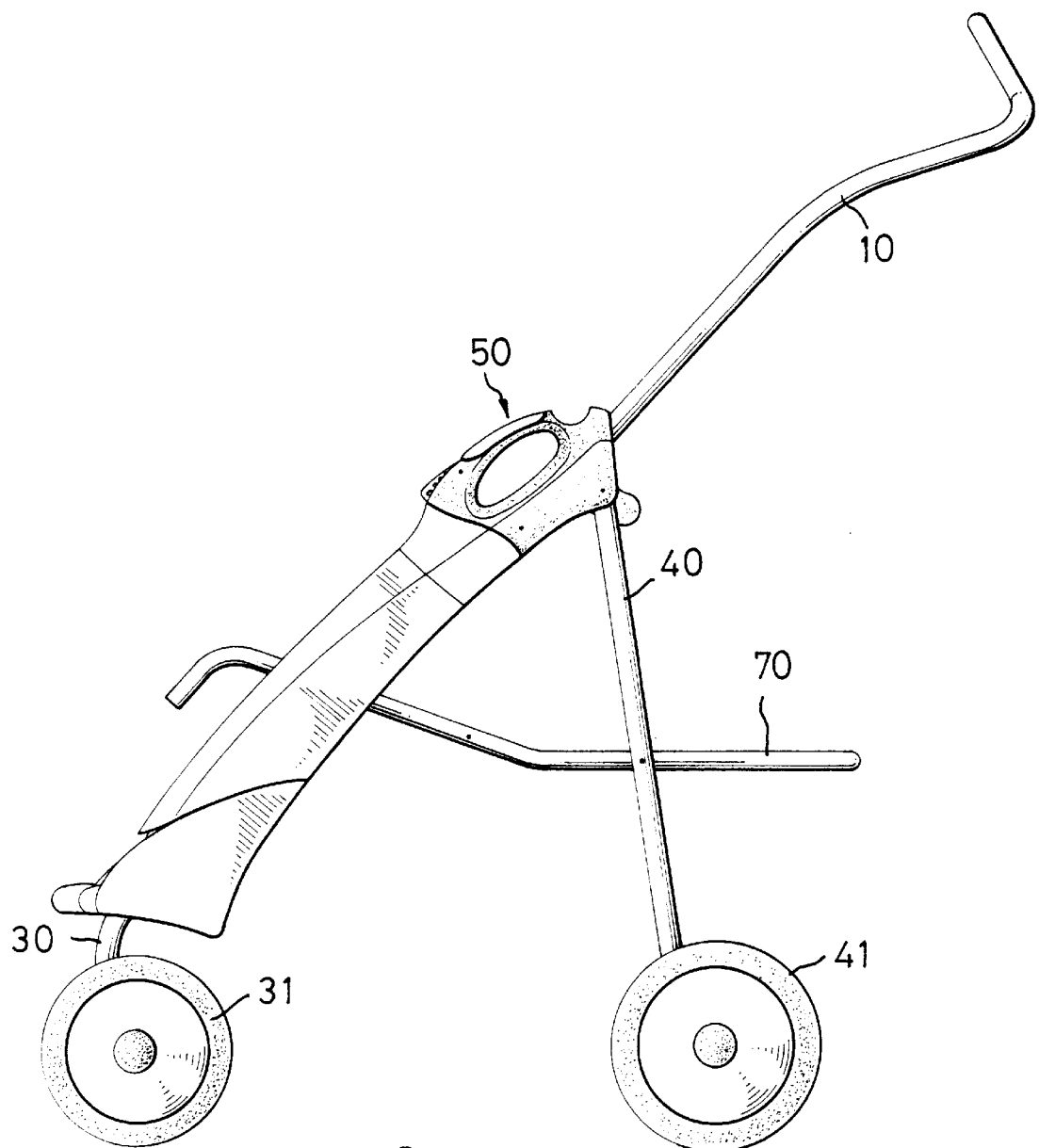
FIG. 1 is a schematic view of a stroller having a foldable mechanism in accordance with the invention.

Referring to FIG. 1, one preferred embodiment of the invention is shown. A stroller constructed in accordance with the present invention comprises a "U" shaped handle 10, a pair of rear supports 40 pivotally connected with the handle 10, a bottom support 70 pivotally connected with the rear supports 40, a pair of front supports 30 pivotally connected with the handle 10 via a foldable mechanism 50 and is also pivotally connected with the bottom support 70. Each distal end of the rear supports 40 and the front supports 30 have a wheel 41, 31 respectively and rotatably connected therewith, such that the stroller is able to be pushed around by a user.

Figure 2:
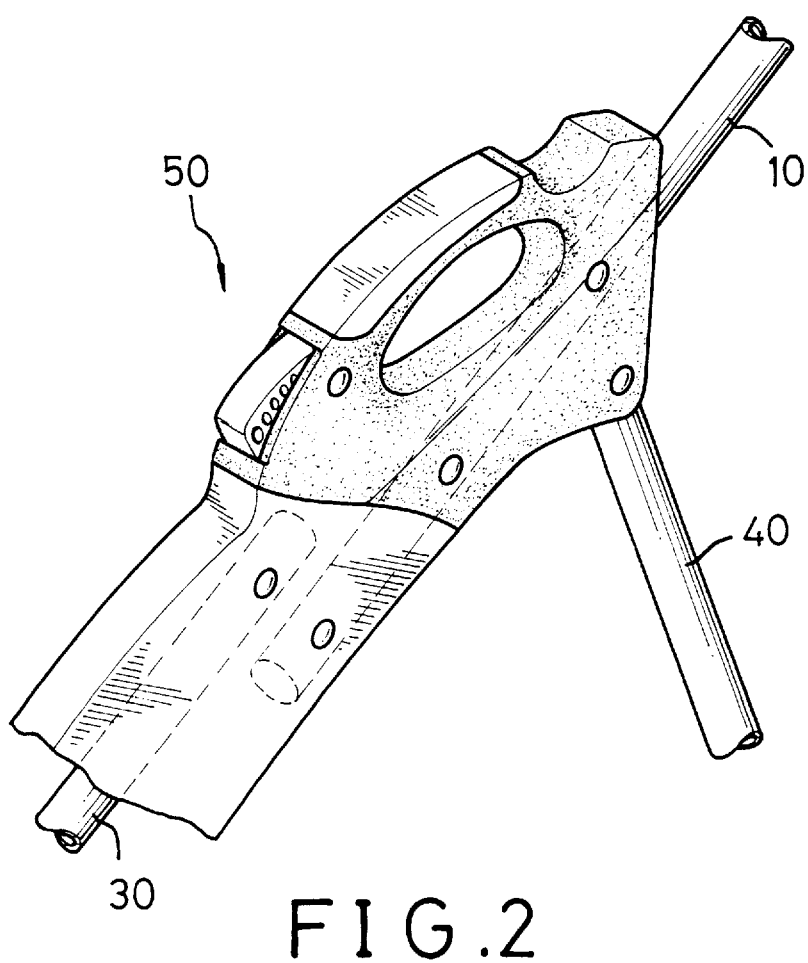
FIG. 2 is a partial perspective view of the foldable mechanism as shown in FIG. 1.
Figure 3:
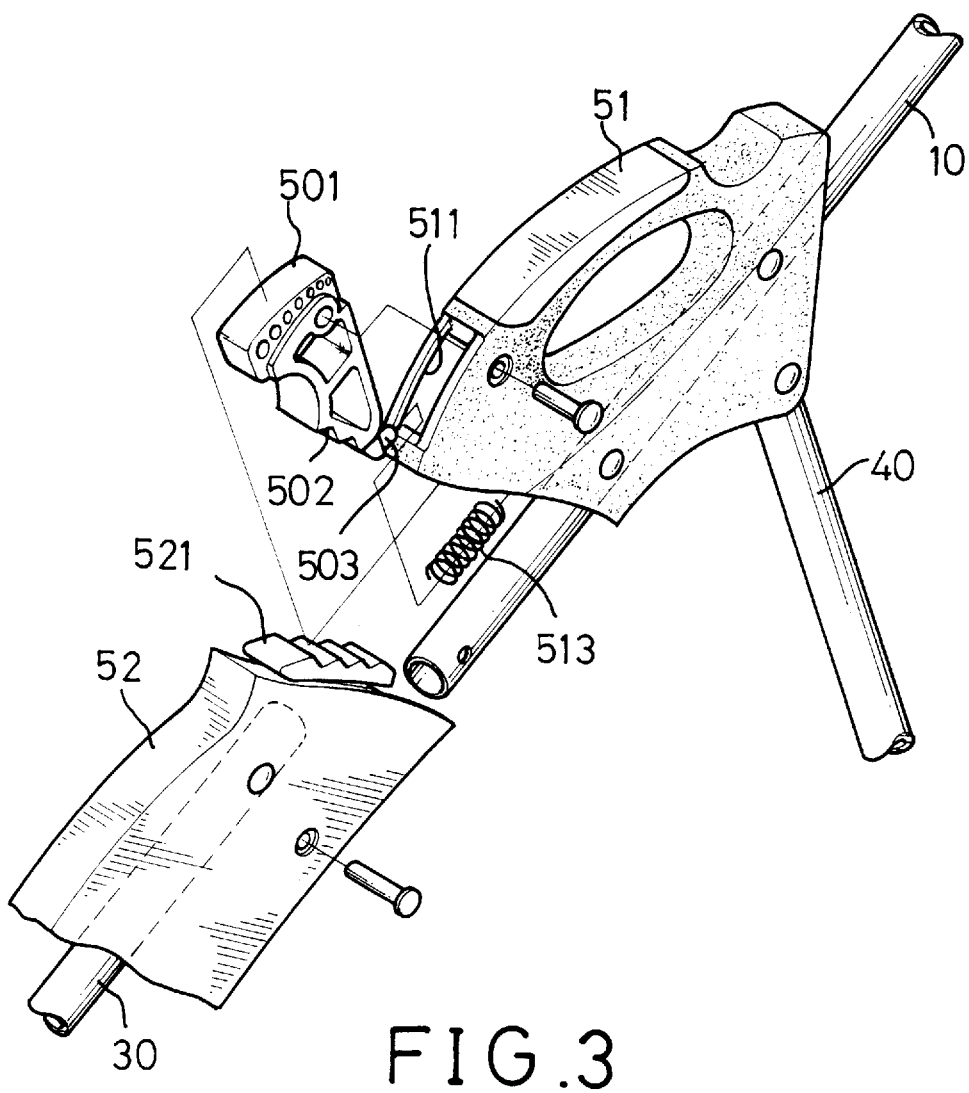
FIG. 3 is an exploded view of the foldable mechanism.

Referring to FIGS. 2 and 3, it is noted that the foldable mechanism 50 is mounted on the handle 10, and is pivotally connected with the rear supports 40 and the front supports 30. The foldable mechanism 50 includes an upper controlling member 51 which is securely connected with the handle 10 and is pivotally connected with the rear support 40, and a lower controlling member 52 which is pivotally connected with the front support 30. The upper controlling member 51 has a switch 501 pivotally received within a notch 511 provided therein. The switch 501 is configured to have a first beveled stepped engagement surface 502 and a boss 503 provided opposed to the beveled stepped engagement surface 502. Further referring to FIGS. 4 and 5, a channel 512 is defined and provided within the upper controlling member 51 for receiving a coil spring 513 therein. One end of the coil spring 513 abuts the boss 503 and the other end of the coil spring 513 is, as previously described, received within the channel 512. The lower controlling member 52 pivotally connected with the front support 30 also has a second beveled stepped engagement surface 521 mated with the first beveled stepped surface 502, such that when the stroller of the invention is in use, the two stepped engagement surfaces 502, 521 are strongly connected with each other due to the increase of the engaging surface between the upper controlling member 51 and the lower controlling member 52.

Figure 4:
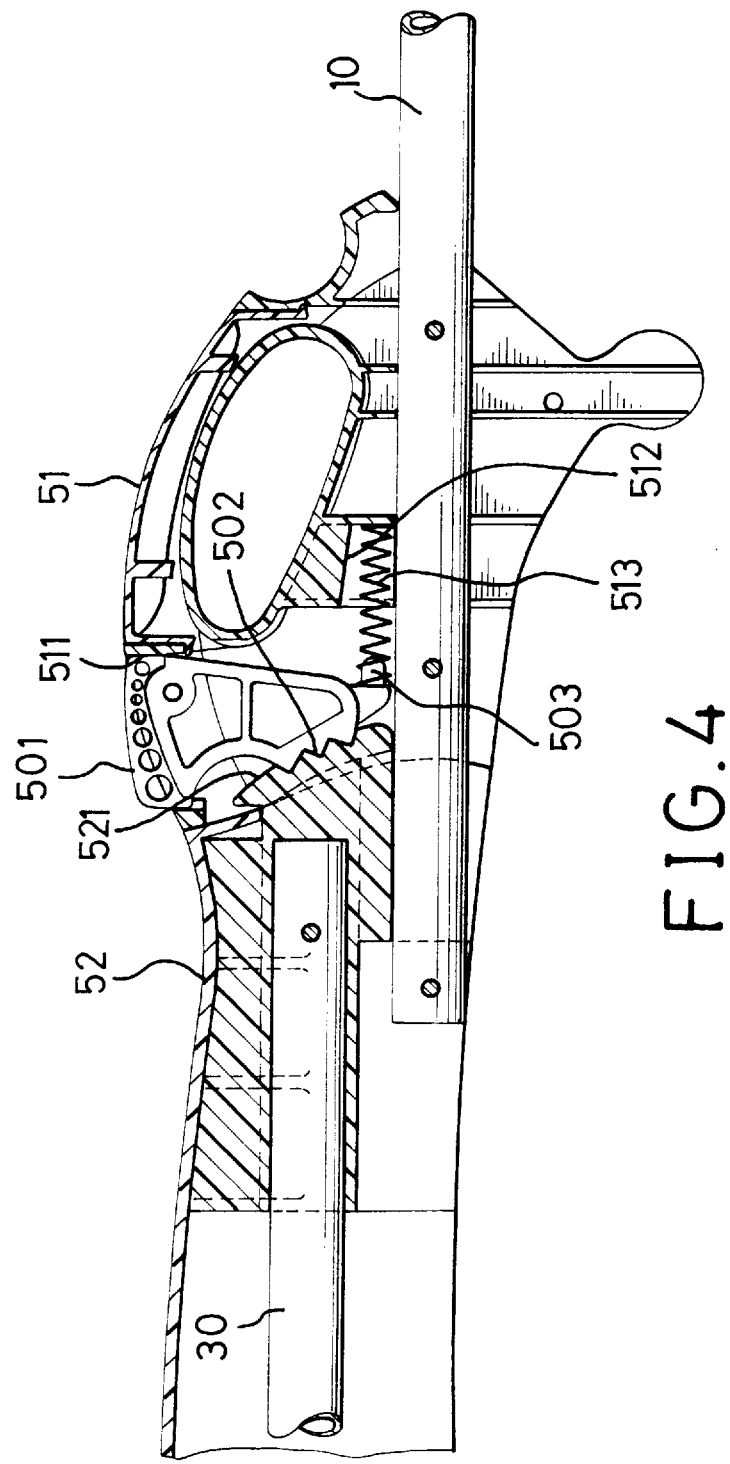
FIG. 4 is a sectional view of the foldable mechanism.
Figure 5:
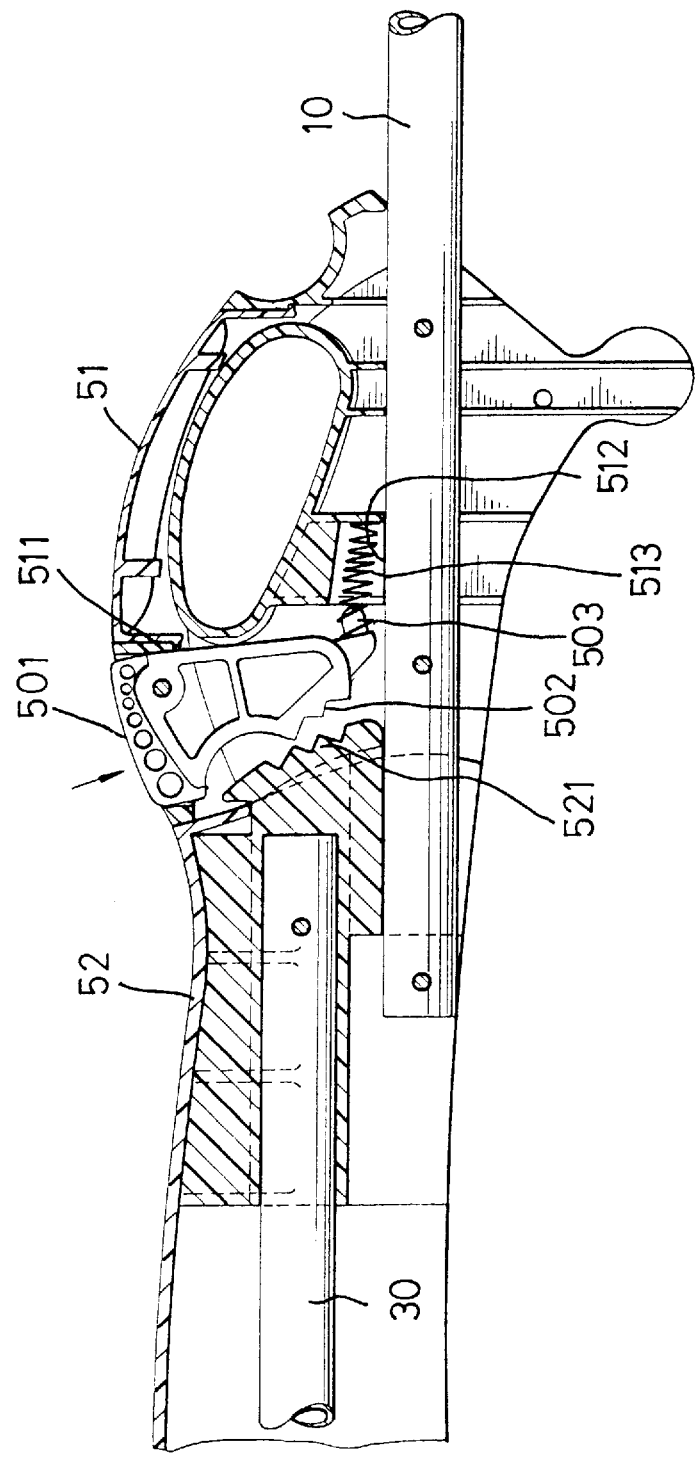
FIG. 5 is a schematic view of the foldable mechanism showing that the switch is pressed downward and a first engagement surface is being separated from a second engagement surface.

Still referring to FIGS. 4 and 5, it is noted that when the foldable mechanism 50 of the invention is assembled, the switch 501 pivotally received within the notch 511 of the upper controlling member 51 abuts one end of the coil spring 513 and thus the two stepped engagement surfaces 502, 521 are securely connected with each other. When the switch 501 is pressed downward, the two engagement surfaces 502, 521 of respectively the switch 501 and the lower controlling member 52 are separated from each other and the coil spring 513 is thus compressed to provide a recovery force to the switch 501 if the downward force pressing downward the switch 501 is no longer exerting thereon.

Figure 6:
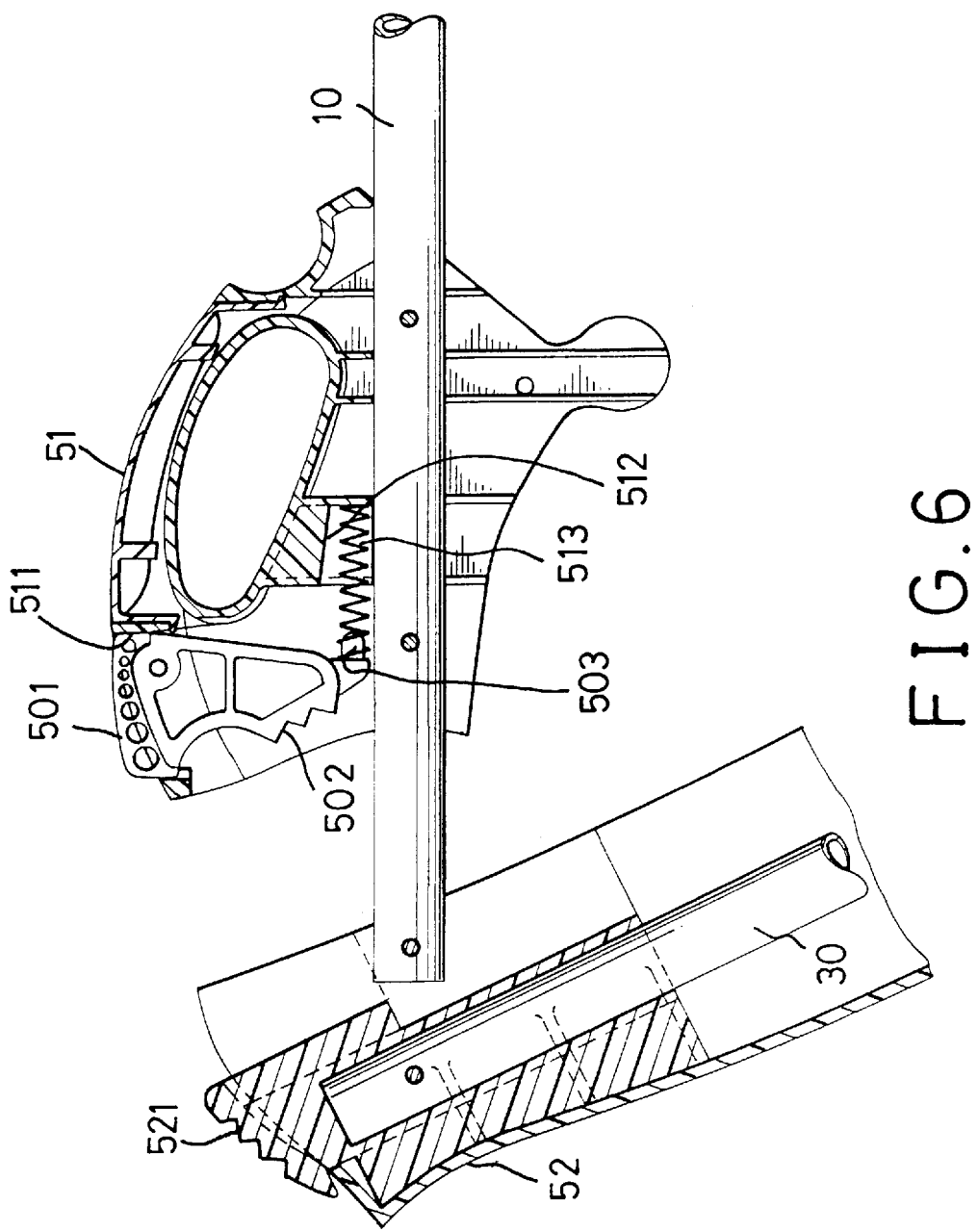
FIG. 6 is a schematic view of the foldable mechanism showing that the first engagement surface is fully separate from the second engagement surface and the stroller is folded.

FIG. 6 shows that when the foldable mechanism 50 of the present invention is folded, the handle 10 is thus separated from the front support 30 via the folded foldable mechanism 50.

Although the present invention describes only one side of the stroller, and does not mention any detail of the link of the other side of the stroller, it is pertinent to one skilled in the art that using a suitable member will help to achieve the purpose of linking another side of the stroller.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A foldable mechanism for use in a stroller comprising:

a handle and a front support;

the foldable mechanism further comprising:

an upper controlling member securely connected with said handle and having, a notch provided therein, a switch pivotally received within said notch and having a stepped engagement surface formed thereon, a channel defined within said upper controlling member, and a coil spring received within said channel and having a first end abutted within said channel and a second end abutting to said switch; and a lower controlling member pivotally connected with said front support and having a second stepped engagement surface formed thereon, whereby said first stepped engagement surface is mated with said second stepped engagement surface.

2. The foldable mechanism for use in a stroller as claimed in claim 1, wherein said switch further comprises a boss formed opposed to said first stepped engagement surface and abuts to said coil spring.

3. The foldable mechanism for use in a stroller as claimed in claim 1, wherein said first stepped engagement surface provided on said switch of said upper controlling member and said second stepped engagement surface formed on said lower controlling member are beveled and oriented toward opposite direction.

4. The foldable mechanism for use in a stroller as claimed in claim 3, wherein said first beveled stepped engagement surface and said second beveled stepped engagement surface are mated to each other.

\* \* \* \* \*